United States Patent
Watanabe et al.

(10) Patent No.: US 11,649,381 B2
(45) Date of Patent: May 16, 2023

(54) ADHESIVE TAPE

(71) Applicant: DIC Corporation, Tokyo (JP)

(72) Inventors: Daisuke Watanabe, Kita-adachi-gun (JP); Takamine Sugiura, Kita-adachi-gun (JP)

(73) Assignee: DIC CORPORATION, Tokyo (JP)

(*) Notice: Subject to any disclaimer, the term of this patent is extended or adjusted under 35 U.S.C. 154(b) by 105 days.

(21) Appl. No.: 16/975,525

(22) PCT Filed: Feb. 26, 2019

(86) PCT No.: PCT/JP2019/007214
§ 371 (c)(1),
(2) Date: Aug. 25, 2020

(87) PCT Pub. No.: WO2019/167922
PCT Pub. Date: Sep. 6, 2019

(65) Prior Publication Data
US 2021/0032506 A1 Feb. 4, 2021

(30) Foreign Application Priority Data

Mar. 1, 2018 (JP) .............. JP2018-036500

(51) Int. Cl.
C09J 7/38 (2018.01)
C09J 11/04 (2006.01)
(52) U.S. Cl.
CPC .............. C09J 7/385 (2018.01); C09J 11/04 (2013.01); C09J 2433/00 (2013.01)
(58) Field of Classification Search
CPC ... B32B 7/00–7/14; B32B 27/00–27/42; C09J 7/00–7/50; C09J 11/00–11/08; C09J 2453/006; C09J 2453/00; C09J 2423/16; C09J 2453/166; Y10T 428/00–428/8305
See application file for complete search history.

(56) References Cited

U.S. PATENT DOCUMENTS

2017/0145267 A1* 5/2017 Liu ................ B32B 7/06
2018/0086954 A1* 3/2018 Morioka ........... C09J 9/02

FOREIGN PATENT DOCUMENTS

| CN | 105331297 A | 2/2016 | |
| CN | 105623333 A | 6/2016 | |
| CN | 106520004 A | 3/2017 | |
| EP | 2698406 A1 * | 2/2014 | ........... C09J 133/08 |
| JP | 2004-162064 A | 6/2004 | |
| JP | 2016-47904 A | 4/2016 | |
| JP | 2016132697 A * | 7/2016 | ........... C09J 133/06 |
| JP | 2017-57303 A | 3/2017 | |
| WO | WO-2013134000 A1 * | 9/2013 | ........... B32B 15/088 |

OTHER PUBLICATIONS

Machine translation of JP2016132697. Retrieved Nov. 6, 2020.*
International Search Report dated May 21, 2019, issued in counterpart International Application No. PCT/JP2019/007214 (1 page).

* cited by examiner

Primary Examiner — Prashant J Khatri
(74) Attorney, Agent, or Firm — WHDA, LLP

(57) ABSTRACT

An object of the present invention is to provide an adhesive tape that has high conformability and high adhesion to an adherend, particularly, to a hard adherend and that has high removability such that the adhesive tape, when peeled off, can be easily peeled off if it is stretched not only in the horizontal direction of the adhesive tape but also at an angle, without the need to embrittle the adhesive tape, for example, by heating or by using an organic solvent and without leaving an adhesive on the adherend. The present invention relates to an adhesive tape including an adhesive layer containing a filler. The adhesive tape has a thickness of more than 150 μm and less than 1,500 μm, an elongation at break of 600% to 3,000%, and a tensile strength at break of 2.5 to 80.0 MPa.

16 Claims, No Drawings

ADHESIVE TAPE

TECHNICAL FIELD

The present invention relates to an adhesive tape.

BACKGROUND ART

Adhesive tapes have been extensively used, for example, in fixation of parts of electronic appliances. Specifically, the adhesive tapes have been used, for example, to fix metal sheets together or fix exterior parts to housings in relatively large electronic appliances such as flat-screen televisions, household electrical appliances, and OA appliances and to fix exterior parts or rigid parts such as batteries to relatively small electronic appliances such as portable electronic terminals, cameras, and personal computers. Such a rigid part may have an uneven shape or a distortion, and the adhesive tapes are required to have so high conformability as to exhibit strong adhesion while conforming to such a surface shape.

In the art of OA equipment such as flat-screen televisions, household electrical appliances, printers, and copiers, reusable parts used in products have often been disassembled after use and reused for the purpose of, for example, resource saving from the viewpoint of environmental harmony. In this case, when an adhesive tape is used, the adhesive tape attached to a part needs to be peeled off, and a problem may arise in the peeling: for example, an adhesive may remain on the adherend; the adhesive tape may break; or a double-sided adhesive tape may be ruptured between nonwoven fabric layers.

When hard materials such as metal and plastic materials are firmly bonded to each other with an adhesive tape of the related art, they need to be peeled off from each other, for example, by softening adhesive components by heating. In this case, however, adherends to be reused, i.e., the metal and plastic materials, may also be affected, for example, thermally degraded. Alternatively, the adherends can also be peeled off from each other by embrittling the adhesive tape by using an organic solvent or the like, but the adherends may be degraded as in the case of heating.

To overcome the above-described problems, a band-shaped transparent pressure-sensitive adhesive sheet formed of three layers has been proposed, the three layers each being formed of a transparent adhesive including a hydrogenated vinyl aromatic block copolymer and a tackifier resin as base materials (PTL 1). However, when three layers, each including a hydrogenated vinyl aromatic block copolymer and a tackifier as base materials, are stacked on top of each other, a sufficient initial adhesion ability cannot be obtained in some cases, leading to problems such as decrease in adhesion in the case where hard adherends with great distortions are bonded to each other.

Alternatively, a commonly used adhesive tape having high adhesive strength may be used, but removability to be achieved cannot be sufficiently ensured.

CITATION LIST

Patent Literature

PTL 1: Japanese Unexamined Patent Application Publication No. 2004-162064.

SUMMARY OF INVENTION

Technical Problem

An object of the present invention is to provide an adhesive tape that has high adhesion to an adherend, particularly, to a hard adherend and that has high removability such that the adhesive tape, when peeled off, can be easily peeled off if it is stretched not only in the horizontal direction of the adhesive tape but also at an angle, without the need to embrittle the adhesive tape, for example, by heating or by using an organic solvent and without leaving an adhesive on the adherend.

Solution to Problem

The present inventors have intensively studied and completed the present invention for solving the problems described above.

The present invention provides an adhesive tape including an adhesive layer containing a filler. The adhesive tape has a thickness of more than 150 μm and less than 1,500 μm, an elongation at break of 600% to 3,000%, and a tensile strength at break of 2.5 to 80.0 MPa.

Advantageous Effects of Invention

The adhesive tape of the present invention provides high adhesion even when hard adherends such as metal and plastic materials are bonded to each other and allows the adherends to foe firmly bonded. When the adherends are peeled off from each other, the adhesive tape can be easily peeled off if it is stretched not only in the horizontal direction but also at an angle, without the need to embrittle the adhesive tape by heating or by using an organic solvent and without any residue of the adhesive or the like on the adherends, which allows the adherends to be reused.

DESCRIPTION OF EMBODIMENTS

A configuration of an adhesive tape of the present invention will now be described in more detail.

<Adhesive Tape>

The adhesive tape of the present invention has a thickness of more than 150 μm and less than 1,500 μm, an elongation at break of 600% to 3,000%, and a tensile strength at break of 2.5 to 80.0 MPa.

The thickness of the adhesive tape is preferably larger than 150 μm, more preferably 170 pro or more, still more preferably 200 μm or more, and particularly preferably 250 μm or more. The thickness of the adhesive tape is preferably less than 1,500 μm, preferably 1,400 μm or less, more preferably 1,300 μm or less, and particularly preferably 1,200 μm or less. When the thickness of the adhesive tape is within the above range, it is advantageous in that high conformability, for example, to a distortion of an adherend and high adhesive strength are readily provided and that the stress required when the adhesive tape is stretched in the horizontal direction and removed is not excessively high. The adhesive tape of the present invention may also be used in the case where the adherend has a large area while being a hard material such as a metal or plastic material. In general, an adherend having a larger area is more difficult to form with less distortion. The adhesive tape in conformance with such a distortion of an adherend allows a fine mechanism such as an electronic appliance to be more accurately completed.

The elongation at break of the adhesive tape is preferably 600% to 3,000%, more preferably 650% to 2,800%, still more preferably 700% to 2,700%, and even more preferably 750% to 2,600%. As described above, the adhesive tape of the present invention is a relatively thick adhesive tape having a thickness of more than 150 μm and less than 1,500 μm and has strong adhesion. When the adhesive tape firmly bonded as in the present invention is elongated and peeled off, an elongation at break within the above range allows the adhesive tape, if firmly bonded to an adherend, to be peeled off at a moderate tensile stress and allows the adhesive tape to be easily peeled off without an excessive elongation of the adhesive tape also in a peeling step.

The tensile strength at break of the adhesive tape is preferably 2.5 to 80.0 MPa, more preferably 3.0 to 60.0 MPa, still more preferably 3.5 to 30.0 MPa, and even more preferably 4.0 to 20.0 MPa. When the tensile strength at break of the adhesive tape is within the above range, the adhesive tape cannot break when stretched and peeled off, and the adhesive tape is readily elongated in a suitable manner, thus facilitating the operation of removal by peeling. The force required when the adhesive tape is stretched and deformed depends also on the thickness of the adhesive tape. For example, when an adhesive tape having a large thickness and a high tensile strength at break is stretched and removed, the adhesive tape cannot be sufficiently stretched and cannot be removed.

The stress at 25% elongation of the adhesive tape is preferably 0.05 to 10.0 MPa, more preferably 0.1 to 5.0 MPa, still more preferably 0.15 to 3.0 MPa, and even more preferably 0.2 to 2.0 MPa. When the stress at 25% elongation of the adhesive tape is within the above range, the adhesive tape can be provided with a suitable adhesive strength and can be relatively easily peeled off in the step of removal. Below the above range, the adhesive tape may be peeled off when a load is applied in the shear direction of the adhesive tape while hard adherends are fixed to each other. Above the above range, an excessive force is required to elongate the adhesive tape in the step of peeling off the adhesive tape.

The stress at 50% elongation of the adhesive tape is preferably 0.05 to 10.5 MPa, more preferably 0.1 to 5.5 MPa, still more preferably 0.15 to 3.5 MPa, and even more preferably 0.2 to 2.5 MPa. When the stress at 50% elongation of the adhesive tape is within the above range, the adhesive tape can foe provided with a suitable adhesive strength and can be relatively easily peeled off in the step of removal. Below the above range, the adhesive tape may be peeled off when a load is applied in the shear direction of the adhesive tape while hard adherends are fixed to each other. Above the above range, an excessive force is required to elongate the adhesive tape in the step of peeling off the adhesive tape.

The stress at 50% elongation of the adhesive tape is preferably 100% to 160%, more preferably 103% to 150%, still more preferably 105% to 140%, and even more preferably 110% to 130%, of the stress at 25% elongation of the adhesive tape.

When the stress at 50% elongation of the adhesive tape is within the above range relative to the stress at 25% elongation of the adhesive tape, the stress required for peeling in the step of removal during the removal of the adhesive tape can be stabilized.

The storage elastic modulus E' (23° C.) at 23° C. of the adhesive tape is preferably $1.0 \times 10^4$ to $1.0 \times 10^8$ Pa, more preferably $5.0 \times 10^4$ to $5.0 \times 10^7$ Pa, still more preferably $1.0 \times 10^5$ to $1.0 \times 10^7$ Pa, and even more preferably $3.0 \times 10^5$ to $8.0 \times 10^6$ Pa. When the storage elastic modulus E' (23° C.) at 23° C. of the adhesive tape is within the above range, high conformability, for example, to a distortion of an adherend and high adhesive strength are readily provided, and the dimensional stability of the adhesive tape can also be ensured, thus leading to good ease of bonding. As described above, the adhesive tape of the present invention may also be used in the case where the adherend has a large area while being a hard material such as a metal or plastic material. In general, an adherend having a larger area is more difficult to form with less distortion. An adhesive tape having a storage elastic modulus within the above range can conform to such a distortion of an adherend as described above and can provide suitable adhesion.

The 180° peel adhesive strength of the adhesive tape is preferably not less than 5 N/20 mm, more preferably not less than 7 N/20 mm, still more preferably not less than 9 N/20 mm, and even more preferably not less than 12 N/20 mm. When the 180° peel adhesive strength of the adhesive tape is within the above range, high adhesion is readily provided even between rigid-body adherends. If an adhesive tape that is stretchable as in the present invention has a 180° peel adhesive strength below the above range, it suggests that the interfacial adhesion to an adherend is low. Thus, when the adhesive tape is used to bond rigid bodies to each other, there is a concern that a sufficient adhesive behavior cannot be exhibited.

<Adhesive Layer>

The adhesive tape of the present invention includes an adhesive layer containing a filler. The adhesive layer may be an adhesive known in the art.

(Filler)

The adhesive layer of the adhesive tape of the present invention contains a filler.

The filler constituting the adhesive tape of the present invention may be at least one filler selected from the group consisting of various inorganic fillers such as metals, metal hydroxides, metal oxides, silicates, carbon, and silica and organic beads.

Examples of the metals include aluminum, magnesium, zirconium, calcium, barium, tin, nickel, titanium, copper, silver, and gold.

Examples of the metal hydroxides include aluminum hydroxide, magnesium hydroxide, zirconium hydroxide, calcium hydroxide, and barium hydroxide.

Examples of the metal oxides include silicon oxide, magnesium oxide, zinc oxide, titanium oxide, zirconium oxide, iron oxide, aluminum oxide, and calcium oxide.

Examples of the silicates include talc and mica.

The type of the filler can be selected according to the properties required for the adhesive tape, and for example, when flame resistance is imparted, it is preferable to use aluminum hydroxide or magnesium hydroxide. In particular, aluminum hydroxide is preferred because it starts to undergo a thermal decomposition reaction at about 250° C. and can exhibit a flame-retardant effect before the adhesive tape is significantly melted.

The shape of the filler may be a regular shape or an irregular shape, and the filler preferably has a non-platy or non-scaly shape. The non-platy or non-scaly shape refers to a shape having an aspect ratio of about 1 to 10. In particular, the aspect ratio is preferably 1 to 10, more preferably 1 to 9, still more preferably 1 to 8.

The filler preferably has an average particle size of 0.01 μm to 70 μm, more preferably has an average particle size of 0.05 μm to 50 μm, still more preferably has an average particle size of 0.1 μm to 30 μm, and even more preferably has an average particle size of 0.5 µm to 15 µm. Within the above range, both a higher adhesion ability and high removability can be achieved. The average particle size refers to a value measured using a 9320HRA Microtrac particle size distribution analyzer (manufactured by Nikkiso Co., Ltd.).

To provide higher removability, the amount of the filler is preferably in the range of 1 vol % to 30 vol %, more preferably in the range of 10 vol % to 75 vol %, more preferably in the range of 15 vol % to 70 vol %, and still more preferably in the range of 20 vol % to 60 vol %, relative to the total volume of components constituting an adhesive layer of the adhesive tape. Within the above range, both a higher adhesion ability and high removability can be achieved.

The thickness of the adhesive layer varies depending on the configuration of the adhesive tape of the present invention. When the adhesive tape of the present invention is formed only of the adhesive layer, the thickness thereof is preferably larger than 150 µm, more preferably 170 µm or more, still more preferably 200 µm or more, and particularly preferably 250 µm or more. The thickness of the adhesive tape is preferably less than 1,500 µm, preferably 1,400 µm or less, more preferably 1,300 µm or less, and particularly preferably 1,200 µm or less. When the adhesive tape of the present invention includes a substrate, the thickness of the adhesive layer is preferably 1/2 to 1/500, more preferably 1/3 to 1/300, still more preferably 1/5 to 1/200, and even more preferably 1/5 to 1/50, relative to the thickness of the substrate layer. When the thickness ratio between the adhesive layer and the substrate layer of the adhesive tape is within the above range, the adhesive tape can be provided with high adhesion and removability. In the adhesive tape of the present invention, the cohesive strength of the adhesive layer is lower than the cohesive strength of the substrate, and thus if the thickness of the adhesive layer is larger than the above range, the adhesive layer alone may remain on an adherend in the step of removing the adhesive tape. If the thickness of the adhesive layer is smaller than the above range, the adhesive layer cannot conform to an adherend in the case where the surface of the adherend has an uneven shape or the like, as a result of which the adhesive strength may be significantly reduced.

The tensile strength at break of the adhesive layer is preferably 0.5 to 25.0 MPa, more preferably 0.8 to 20.0 MPa, still more preferably 1.0 to 17.0 MPa, and even more preferably 1.2 to 15.0 MPa. When the tensile strength at break of the adhesive layer is within the above range, it is advantageous in that high adhesion can be exhibited and that adhesive components are less likely to remain on an adherend when the adhesive tape of the present invention is stretched in the horizontal direction and peeled off.

Examples of adhesives used for the adhesive layer include acrylic adhesives, urethane adhesives, rubber adhesives such as synthetic rubber adhesives and natural rubber adhesives, and silicone adhesives.

(Acrylic Adhesive)

The acrylic adhesive may contain an acrylic polymer and optionally additives such as a tackifier resin and a crosslinking agent.

The acrylic polymer can be produced, for example, by polymerizing a monomer mixture containing a (meth)acrylic monomer.

The (meth)acrylic monomer may be, for example, an alkyl (meth)acrylate having an alkyl group having 1 to 12 carbon atoms. For example, methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, cyclohexyl (meth)acrylate, 2-ethylhexyl (meth)acrylate, and the like can be used alone or in combination of two or more.

The alkyl (meth)acrylate having an alkyl group having 1 to 12 carbon atoms is preferably an alkyl (meth)acrylate having an alkyl group having 4 to 12 carbon atoms, more preferably an alkyl (meth)acrylate having an alkyl group having 4 to 8 carbon atoms, and particularly preferably n-butyl acrylate in order to ensure high adhesion to an adherend.

The amount of the alkyl (meth)acrylate having an alkyl group having 1 to 12 carbon atoms relative to the total amount of monomer used to produce the acrylic polymer is preferably in the range of 80 mass % to 98.5 mass %, more preferably in the range of 90 mass % to 98.5 mass %.

In addition to the monomers described above, a highly polar vinyl monomer can optionally be used as the monomer used to produce the acrylic polymer.

Examples of the highly polar vinyl monomer include (meth)acrylic monomers such as a (meth)acrylic monomer having a hydroxyl group, a (meth)acrylic monomer having a carboxyl group, and a (meth)acrylic monomer having an amide group. These can be used alone or in combination of two or more.

Examples of the vinyl monomer having a hydroxyl group include (meth)acrylic monomers such as 2-hydroxyethyl (meth)acrylate, 2-hydroxypropyl (meth)acrylate, 4-hydroxybutyl (meth)acrylate, and 6-hydroxyhexyl (meth)acrylate.

Examples of the vinyl monomer having a carboxyl group include (meth)acrylic monomers such as acrylic acid, methacrylic acid, itaconic acid, maleic acid, (meth)acrylic acid dimer, crotonic acid, and ethylene-oxide-modified succinic acid acrylate. In particular, acrylic acid is preferably used.

Examples of the vinyl having an amide group include (meth)acrylic monomers such as N-vinylpyrrolidone, N-vinylcaprolactam, acryloylmorpholine, acrylamide, and N,N-dimethylacrylamide.

In addition to the monomers described above, sulfonic-group-containing monomers such as vinyl acetate, ethylene-oxide-modified succinic acid acrylate, and 2-acrylamide-2-methylpropane sulphonate can be used as the highly polar vinyl monomer.

The amount of the highly polar vinyl monomer relative to the total amount of monomer used to produce the acrylic polymer is preferably in the range of 1.5 mass % to 20 mass %, more preferably in the range of 1.5 mass % to 10 mass %, and still more preferably in the range of 2 mass % to 8 mass % because an adhesive layer having a good balance of cohesive strength, retentivity, and adhesion can be formed.

Among the highly polar vinyl monomers, the vinyl monomer having a hydroxyl group is preferably used when the adhesive contains an isocyanate crosslinking agent. Specifically, the vinyl monomer having a hydroxyl group is preferably 2-hydroxyethyl (meth)acrylate, 4-hydroxybutyl (meth)acrylate, or 6-hydroxyhexyl (meth)acrylate.

The amount of the vinyl monomer having a hydroxyl group relative to the total amount of monomer used to produce the acrylic polymer is preferably in the range of 0.01 mass % to 1.0 mass %, more preferably in the range of 0.03 mass % to 0.3 mass %.

The acrylic polymer can be produced by polymerizing the monomer by a known polymerization method such as solution polymerization, bulk polymerization, suspension polymerization, or emulsion polymerization, and is preferably produced by solution polymerization or bulk polymerization.

In the polymerization, a peroxide thermal polymerization initiator such as benzoyl peroxide or lauroyl peroxide, an azo thermal polymerization initiator such as azobisisobutylnitrile, an acetophenone photopolymerization initiator, a benzoin ether photopolymerization initiator, a benzyl ketal photopolymerization initiator, an acylphosphine oxide photopolymerization initiator, a benzoin photopolymerization initiator, or a benzophenone photopolymerization initiator can be used as required.

The weight average molecular weight of the acrylic polymer obtained by the above-described method is preferably 300,000 to 3,000,000, more preferably 500,000 to 2,500,000, in terms of standard polystyrene measured by gel permeation chromatography (GPC).

The measurement of the molecular weight by GPC is performed using a GPC system (HLC-8329GPC) manufactured by Tosoh Corporation in terms of standard polystyrene under the following conditions.

Sample concentration: 0.5 mass % (tetrahydrofuran solution)
Sample injection volume: 100 μL
Eluent: THF
Flow rate: 1.0 mL/min
Temperature: 40° C.
Main column: TSKgel GMHHR-H(20), two columns
Guard column: TSKgel HXL-H
Detector: differential refractometer
Molecular weight of standard polystyrene: 10,000 to 20,000,000 (manufactured by Tosoh Corporation)

The acrylic adhesive preferably contains a tackifier resin to improve adhesion to an adherend and surface adhesive strength.

Examples of the tackifier resin include rosin tackifier resins, polymerized rosin tackifier resins, polymerized rosin ester tackifier resins, rosin-phenol tackifier resins, stabilized rosin ester tackifier resins, disproportionated rosin ester tackifier resins, hydrogenated rosin ester tackifier resins, terpene tackifier resins, terpene-phenol tackifier resins, petroleum resin tackifier resins, and (meth)acrylate tackifier resins.

In particular, the tackifier resin is preferably a disproportionated rosin ester tackifier resin, a polymerized rosin ester tackifier resin, a rosin-phenol tackifier resin, a hydrogenated rosin ester tackifier resin, a (meth)acrylate resin, a terpene phenol resin, or a combination of two or more thereof.

The tackifier resin preferably has a softening point of 30° C. to 180° C., and more preferably has a softening point of 70° C. to 140° C. in order to form an adhesive layer having a high adhesion ability. When a (meth)acrylate tackifier resin is used, the glass transition temperature thereof is preferably 30° C. to 200° C., more preferably 50° C. to 160° C.

The amount of the tackifier resin relative to 100 parts by mass of the acrylic polymer is preferably in the range of 5 parts by mass to 65 parts by mass, and more preferably in the range of 8 parts by mass to 55 parts by mass because adhesion to an adherend is readily ensured.

The acrylic adhesive preferably contains a crosslinking agent in order to further improve the cohesive strength of the adhesive layer. Examples of the crosslinking agent include isocyanate crosslinking agents, epoxy crosslinking agents, metal-chelate crosslinking agents, and aziridine crosslinking agents. In particular, the crosslinking agent is preferably of a type that is added after the production of an acrylic polymer to promote crosslinking reaction, and isocyanate crosslinking agents and epoxy crosslinking agents, which are highly reactive with acrylic polymers, are preferably used.

Examples of the isocyanate crosslinking agents include tolylene diisocyanate, naphthylene-1,5-diisocyanate, hexamethylene diisocyanate, diphenylmethane diisocyanate, xylylene diisocyanate, and trimethylolpropane-modified tolylene diisocyanate. Trifunctional polyisocyanate compounds are particularly preferred. Examples of trifunctional isocyanate compounds include tolylene diisocyanate, trimethylolpropane adducts thereof, and triphenylmethane isocyanate.

As an indicator of the degree of crosslinking, a gel fraction for determining the insoluble content after the adhesive layer is immersed in toluene for 24 hours is used. The gel fraction of the adhesive layer is preferably 10 mass % to 70 mass %, more preferably 25 mass % to 65 mass %, and still more preferably 35 mass % to 60 mass % in order to provide the adhesive layer with good cohesion and good adhesion.

The gel fraction refers to a value measured by the following method. An adhesive composition is applied to a release sheet such that the composition will be 50 μm thick after being dried. The coated sheet is dried at 100° C. for 3 minutes, aged at 40° C. for 2 days, and cut to a 50 mm square to prepare a sample. Next, the mass (G1) of the sample before being immersed in toluene is measured in advance, and the sample is immersed in a toluene solution at 23° C. for 24 hours. The toluene insoluble fraction is then separated by filtration through a 300-mesh metal screen, and the mass (G2) of the residue after drying at 110° C. for 1 hour is measured. The gel fraction is determined by the following formula. The weight (G3) of the conductive fine particles in the sample is calculated from the mass (G1) of the sample and the composition of the adhesive.

$$\text{Gel fraction (mass \%)} = (G2-G3)/(G1-G3) \times 100$$

The adhesive layer of the adhesive tape of the present invention contains the filler and may optionally contain other additives to the extent that the properties thereof is not impaired. Examples of the other additives include additives such as other polymer components, crosslinking agents, age resistors, UV absorbers, filling materials, polymerization inhibitors, surface conditioners, antistatic agents, antifoaming agents, viscosity modifiers, light stabilizers, weathering stabilizers, heat stabilizers, antioxidants, leveling agents, organic pigments, inorganic pigments, pigment dispersants, plasticizers, softeners, flame retardants, and metal deactivators; and inorganic filling materials such as silicon oxide, aluminum oxide, titanium oxide, zirconia, and antimony pentoxide.

(Rubber Adhesive)

The rubber adhesive may be a rubber material that can be generally used as an adhesive. In one particularly preferred aspect, a block copolymer of an aromatic polyvinyl compound and a conjugated diene compound is suitable for use, and in particular, a styrene resin such as a styrene-isoprene-styrene copolymer, a styrene-butadiene-styrene copolymer, a styrene-ethylene-butylene copolymer, or a styrene-ethylene-propylene copolymer can be used.

The styrene resin used as the adhesive of the adhesive tape of the present invention may be a styrene-isoprene copolymer or/and a styrene-isoprene-styrene copolymer or/and a mixture of a styrene-isoprene copolymer and a styrene-isoprene-styrene copolymer. The styrene resin composed of such a component provides the adhesive tape of the present invention with excellent adhesive properties and retentivity.

The styrene resin has a structural unit represented by the following chemical formula (1) in an amount of preferably in the range of 10 mass % to 80 mass %, more preferably in the range of 12 to 60 mass %, still more preferably in the range of 15 to 40 mass %, and even more preferably in the range of 17 to 35 mass %, relative to the total mass of the styrene-isoprene copolymer and the styrene-isoprene-styrene copolymer. This can provide high adhesion and heat resistance.

[Chem. 1]

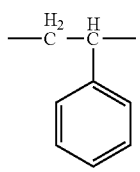

(1)

The styrene resin may contain two or more copolymers having different structures, and may contain a styrene-isoprene copolymer and a styrene-isoprene-styrene copolymer in combination.

The content of the styrene-isoprene copolymer in the styrene resin is preferably in the range of 0 mass % to 80 mass %, more preferably in the range of 0 mass % to 77 mass %, still more preferably in the range of 0 mass % to 75 mass %, and even more preferably in the range of 0 mass % to 70 mass %, relative to the total mass of the styrene-isoprene copolymer and the styrene-isoprene-styrene copolymer. Within the above range, the adhesive tape of the present invention can be provided with both a high adhesion ability and thermal durability.

The weight average molecular weight of the styrene-isoprene copolymer, as measured by gel permeation chromatography (GPC) in terms of standard polystyrene (gel permeation chromatography, SC-8020 manufactured by Tosoh Corporation, high-molecular-weight column: TSKgel GMHHR-H, solvent: tetrahydrofuran), is preferably in the range of 10,000 to 800,000, more preferably in the range of 30,000 to 500,000, and even more preferably in the range of 50,000 to 300,000. Within the above range, an adhesive tape that has good workability in a manufacturing process because thermal flowability and compatibility with a diluent solvent can be ensured and that also has thermal durability is advantageously obtained.

The styrene resin may have a single structure such as a linear structure, a branched structure, or a multi-branched structure and may also have a combination of different structures. When a styrene resin abundant in linear structures is used for the adhesive layer, the adhesive tape of the present invention is provided with a great adhesion ability. In contrast, a styrene resin having a branched structure or a multi-branched structure while also having styrene blocks at its molecular ends can take a pseudo crosslinked structure and provide high cohesive strength, and thus can provide high retentivity. These are preferably used in combination according to required properties.

The styrene-isoprene-styrene copolymer can be produced by any method, and production methods known in the art can be used. The styrene-isoprene-styrene copolymer can be produced in the same manner as described for the substrate.

For the rubber adhesive, a tackifier resin can be used, and in particular, a tackifier resin having a softening point of 80° C. or higher is preferably used. This can provide an adhesive and an adhesive tape that each have high initial adhesion and thermal durability. The softening point refers to a value measured by a method (dry-bulb method) prescribed in JIS K 2207.

The tackifier resin is preferably a resin that is solid, for example, at normal temperature (23° C.) and may be a petroleum resin such as a $C_5$ petroleum resin, a $C_5/C_9$ petroleum resin, or an alicyclic petroleum resin. The petroleum resin is readily compatible with a polyisoprene structure constituting the styrene resin and, as a result, can further improve the initial adhesive strength and the thermal durability of the adhesive and the adhesive tape.

The $C_5$ petroleum resin may be an aliphatic petroleum resin, and examples include Escorez 1202, 1304, and 1401 (manufactured by Toner. Chemical Corporation), Wingtack 95 (manufactured by The Goodyear Tire & Rubber Company), Quintone K100, R100, and F100 (manufactured by Zeon Corporation), and Piccotac 95 and Piccopale 100 (manufactured by Rika Hercules Inc.).

The $C_5/C_9$ petroleum resin may be a copolymer of the $C_5$ petroleum resin and a $C_9$ petroleum resin, and examples include Escorez 2101 (manufactured by TONEX Co., Ltd.), Quintone G115 (manufactured by Zeon Corporation), and Hercotack 1149 (manufactured by Rika Hercules Inc.).

The alicyclic petroleum resin is obtained by hydrogenating the $C_9$ petroleum resin, and examples include Escorez 5300 (manufactured by TONEX Co., Ltd.), Arkon P-100 (manufactured by Arakawa Chemical Industries, Ltd.), and Rigalite R101 (manufactured by Rika Finetech Co., Ltd.).

Examples of the tackifier resin having a softening point of 80° C. or higher include, in addition to the $C_5$ petroleum resin, the $C_5/C_9$ petroleum resin, and the alicyclic petroleum resin, polymerized rosin resins, $C_9$ petroleum resins, terpene resins, rosin resins, terpene-phenol resins, styrene resins, coumarone-indene resins, xylene resins, and phenol resins.

In particular, the tackifier resin having a softening point of 80° C. or higher is preferably a combination of the $C_5$ petroleum resin and a polymerized rosin resin in order to achieve both higher initial adhesion and thermal durability.

The amount of the tackifier resin having a softening point of 80° C. or higher relative to the total amount of the styrene resin is preferably in the range of 3 mass % to 100 mass %, more preferably in the range of 5 mass % to 80 mass %, and more preferably in the range of 5 mass % to 80 mass % in order to obtain an adhesive and an adhesive tape that each have both higher adhesion and high thermal durability.

For the purpose of obtaining bonding properties in a constant-temperature environment and initial adhesion, the tackifier resin having a softening point of 80° C. or higher may be used in combination with a tackifier resin having a softening point of −5° C. or lower. The softening point refers to a value measured by a method in accordance with a method prescribed in JIS K 2207.

The tackifier resin having a softening point of −5° C. or lower is preferably a tackifier resin that is liquid at room temperature. Such a tackifier resin that is liquid at room temperature is preferably select from the known tackifier resins described above.

Examples of the tackifier resin having a softening point of −5° C. or lower include liquid rubbers such as process oil, polyester, and polybutene. Among them, polybutene is preferred in order to exhibit higher initial adhesion.

The amount of the tackifier resin having a softening point of −5° C. or lower relative to the total amount of the tackifier resin is preferably in the range of 0 mass % to 40 mass %, more preferably in the range of 0 mass % to 30 mass %.

The amount of the tackifier resin having a softening point of −5° C. or lower relative to the total amount of the styrene resin is preferably in the range of 0 mass % to 40 mass %, and when the amount is in the range of 0 mass % to 30 mass %, the initial adhesive strength ran be improved to achieve good bonding, and sufficient thermal durability can be obtained.

The mass ratio of the tackifier resin having a softening point of 80° C. or higher and the tackifier resin having a softening point of −5° C. or lower is preferably in the range of 5 to 50, and more preferably in the range of 10 to 30 in order to obtain an adhesive and an adhesive tape that each have both high initial adhesion and high retentivity.

The styrene resin and the tackifier resin are preferably used in combination at a mass ratio, as expressed as [styrene resin/tackifier resin], of 0.5 to 10.0, and when the mass ratio is 0.6 to 9.0, the initial adhesive strength can be improved, and high thermal durability can be obtained. The mass ratio [styrene resin/tackifier resin] is preferably larger than 1 in order to prevent the adhesive tape from peeling off due to its resilience when the adhesive tape is attached, for example, to a curved portion of an adherend (resistance to resilience).

The adhesive layer of the adhesive tape of the present invention contains the filler and may optionally contain other additives to the extent that the properties thereof is not impaired. Examples of the other additives include additives such as other polymer components, crosslinking agents, age resistors, UV absorbers, filling materials, polymerization inhibitors, surface conditioners, antistatic agents, antifoaming agents, viscosity modifiers, light stabilizers, weathering stabilizers, heat stabilizers, antioxidants, leveling agents, organic pigments, inorganic pigments, pigment dispersants, plasticizers, softeners, flame retardants, and metal deactivators; and inorganic filling materials such as silicon oxide, aluminum oxide, titanium oxide, zirconia, and antimony pentoxide.

The age resistor may be an age resistor that can be generally used for adhesives, and examples include those which are described in the section of the substrate.

Examples of methods for producing the adhesive layer include a casting method using extrusion molding, a uniaxial stretching method, a sequential biaxial stretching method, a simultaneous biaxial stretching method, an inflation method, a tube method, a calendering method, and a solution method. In particular, a method of production by the casting method using extrusion molding or the solvent method is suitable for use, and the method may be selected according to the thickness control of the adhesive layer or the compatibility of a layer-forming method with the substrate.

In the case of the solvent method, a method in which the adhesive is directly applied to the substrate with a roll coater or the like or a method in which an adhesive layer is once formed on a release liner and then peeled off for use is used.

Examples of the release liner include those obtained by performing a release treatment with a silicone resin or the like on one or both surfaces of the following: a sheet of paper such as kraft paper, glassine paper, or wood-free paper; a resin film of polyethylene, polypropylene (OPP, CPP), polyethylene terephthalate, or the like; a laminate of the sheet of paper and the resin film; or a sheet of paper obtained by filling the sheet, of paper with clay, polyvinyl alcohol, or the like.

<Substrate>

In one preferred aspect of the adhesive tape of the present invention, a substrate is provided in addition to the adhesive layer for bonding the adhesive tape to an adherend. The adhesive layer may be provided on one or both surfaces of the substrate, and is preferably provided on both surfaces. When the substrate is provided, the thickness thereof is preferably 100 to 1,490 μm, more preferably 120 to 1,390 μm, still more preferably 150 to 1,290 μm, and even more preferably 200 μm to 1,190 μm. When the thickness of the substrate is within the above range, it is advantageous in that the adhesive tape readily conforms to a distortion of an adherend to exhibit high adhesive strength and that the stress required when the adhesive tape is removed while being stretched in the horizontal direction is not excessively high.

The elongation at break of the substrate of the adhesive tape is preferably 600% to 3,000%, more preferably 650% to 2,800%, still more preferably 700% to 2,700%, and even more preferably 750% to 2,600%. When the elongation at break of the substrate is not lower than the lower limit of the above range, even if the adhesive tape is firmly bonded to an adherend, the stress for stretching in the horizontal direction of the adhesive tape in removing the tape is not excessively high, and the adhesive tape can be easily peeled off in the peeling step without being excessively elongated. When the elongation at break of the substrate is not higher than the upper limit of the above range, it is advantageous in that the length of stretch in the horizontal direction of the adhesive tape in removing the tape is not excessively large, which enables an operation in a small space.

The tensile strength at break of the substrate is preferably 2.5 to 80.0 MPa, more preferably 3.0 to 60.0 MPa, still more preferably 3.5 to 30.0 MPa, and even more preferably 4.0 to 20.0 MPa. When the tensile strength at break of the substrate is within the above range, breakage of the adhesive tape can be suppressed when the adhesive tape is stretched and peeled off, and the load for elongating the adhesive tape is not excessive, thus facilitating the operation of removal by peeling. The force required when the adhesive tape is stretched and deformed depends also on the thickness of the adhesive tape. For example, when an adhesive tape having a large thickness and a high tensile strength at break is stretched and removed, the adhesive tape cannot be sufficiently stretched and cannot be removed.

The stress at 25% elongation of the substrate is preferably 0.15 to 10.0 MPa, more preferably 0.25 to 7.0 MPa, still more preferably 0.35 to 5.0 MPa, and even more preferably 0.45 to 2.0 MPa. When the stress at 25% elongation of the substrate is within the above range, the adhesive tape can be provided with a suitable adhesive strength and can be relatively easily peeled off in the step of removal. Below the above range, the adhesive tape may be peeled off when a load is applied in the shear direction of the adhesive tape while hard adherends are fixed to each other. Above the above range, an excessive force is required to elongate the adhesive tape in the step of peeling off the adhesive tape.

The stress at 50% elongation of the substrate is preferably 0.15 to 10.0 MPa, more preferably 0.25 to 7.0 MPa, still more preferably 0.35 to 5.0 MPa, and even more preferably 0.50 to 2.0 MPa. When the stress at 50% elongation of the substrate is within the above range, the adhesive tape can be provided with a suitable adhesive strength and can be relatively easily peeled off in the step of removal. Below the above range, the adhesive tape may be peeled off when a load is applied in the shear direction of the adhesive tape while hard adherends are fixed to each other. Above the above range, an excessive force is required to elongate the adhesive tape in the step of peeling off the adhesive tape.

The stress at 50% elongation of the substrate of the adhesive tape is preferably 100% to 160%, more preferably 103% to 150%, still more preferably 105% to 140%, and even more preferably 110% to 130%, of the stress at 25% elongation of the substrate of the adhesive tape.

When the stress at 50% elongation of the substrate is within the above range relative to the stress at 25% elongation of the substrate, the stress required for peeling in the step of removal during the removal of the adhesive tape can be stabilized.

The storage elastic modulus E' (23° C.) at 23° C. of the substrate is preferably $1.0 \times 10^4$ to $1.0 \times 10^8$ Pa, more preferably $5.0 \times 10^4$ to $5.0 \times 10^7$ Pa, still more preferably $1.0 \times 10^5$ to $1.0 \times 10^7$ Pa, and even more preferably $3.0 \times 10^5$ to $8.0 \times 10^6$ Pa. When the tensile strength at break of the substrate is within the above range, high conformability, for example, to a distortion of an adherend and high adhesive strength are readily provided, and the dimensional stability of the adhesive tape can also be ensured, thus leading to good ease of bonding. As described above, the adhesive tape of the present invention may be used in the case where the adherend has a large area while being a hard material such as a metal or plastic material. In general, an adherend having a larger area is more difficult to form with less distortion, and an adhesive tape having a storage elastic modulus within the above range can conform to such a distortion of an adherend as described above and can provide suitable adhesion.

The substrate of the adhesive tape of the present invention may be composed of any material as long as the properties described above can be exhibited. Examples of such materials include block copolymers of aromatic polyvinyl compounds and conjugated diene compounds, particularly, styrene resins such as styrene-isoprene-styrene copolymers, styrene-butadiene-styrene copolymers, styrene-ethylene-butylene copolymers, and styrene-ethylene-propylene copolymers. Other examples include polyurethane resins such as ester polyurethane and ether polyurethane; polyolefin resins such as polyethylene and polypropylene; polyester resins such as polyethylene terephthalate, polybutylene terephthalate, and polyethylene naphthalate; and polystyrene, polycarbonate, polymethylpentene, polysulfone, polyether ether ketone, polyethersulfone, polyetherimide, polyimide films, fluorocarbon resins, nylon, and acrylic resins. Of these, styrene resins such as styrene-isoprene-styrene copolymers, styrene-butadiene-styrene copolymers, styrene-ethylene-butylene copolymers, and styrene-ethylene-propylene copolymers; and polyurethane resins such as ester polyurethane and ether polyurethane are suitable for use because a suitable elongation at break and a suitable tensile strength at break are readily provided. In particular, styrene resins such as styrene-isoprene-styrene copolymers, styrene-butadiene-styrene copolymers, styrene-ethylene-butylene copolymers, and styrene-ethylene-propylene copolymers are suitable for use.

As described above, the substrate of the adhesive tape of the present invention is preferably a styrene resin film including a resin component composed mainly of a styrene resin, and the styrene resin film may generally be a resin film in which the styrene resin accounts for more than 50% of the resin component. The styrene resin is a resin having thermoplasticity and thus exhibits excellent moldability, for example, in extrusion molding and injection molding, and therefore, the substrate for constituting the adhesive tape of the present invention is readily formed. Among resins generally referred to as thermoplastic resins, the styrene resin tends to provide a particularly high elongation at break and is suitable for use as the substrate of the adhesive tape of the present invention.

The proportion of the styrene resin in the resin component included in the styrene resin film is preferably 50% to 100%, more preferably 60% to 100%, still more preferably 65% to 100%, and even more preferably 70% to 100%. Within this range, a high elongation at break and a high tensile strength at break of the styrene resin film can be exhibited. The styrene resin film may include, in addition to the styrene resin, various thermoplastic resins such as polyolefin and polycarbonate, which can be used alone or in combination.

In one aspect for producing the adhesive tape of the present invention, the styrene resin used for the substrate of the adhesive tape is a styrene-isoprene copolymer or/and a styrene-isoprene-styrene copolymer or/and a mixture of a styrene-isoprene copolymer and a styrene-isoprene-styrene copolymer. The styrene resin constituted by such components can provide an adhesive tape having a particularly preferred elongation at break and a particularly preferred tensile strength at break.

The styrene resin has a structural unit represented by the following chemical formula (2) in an amount of preferably in the range of 13 mass % to 60 mass %, more preferably in the range of 15 to 50 mass %, still more preferably in the range of 16 to 45 mass %, and even more preferably in the range of 17 to 35 mass %, relative to the total mass of the styrene-isoprene copolymer and the styrene-isoprene-styrene copolymer. This readily provides an elongation at break and a tensile strength at break in suitable ranges.

[Chem. 2]

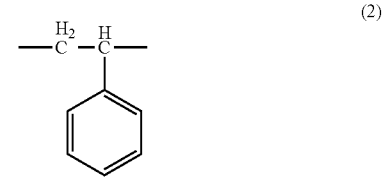

The styrene resin may contain two or more copolymers having different structures, and may contain a styrene-isoprene copolymer and a styrene-isoprene-styrene copolymer in combination.

The content of the styrene-isoprene copolymer in the styrene resin is preferably in the range of 0 mass % to 80 mass %, more preferably in the range of 0 mass % to 70 mass %, still more preferably in the range of 0 mass % to 50 mass %, and even more preferably in the range of 0 mass % to 30 mass %, relative to the total mass of the styrene-isoprene copolymer and the styrene-isoprene-styrene copolymer. Within the above range, a high elongation at break, a high tensile strength at break, and thermal durability can be simultaneously achieved.

The weight average molecular weight of the styrene-isoprene copolymer, as measured by gel permeation chromatography (GPC) in terms of standard polystyrene (gel permeation chromatography, SC-8020 manufactured by Tosoh Corporation, high-molecular-weight column: TSKgel GMHHR-H, solvent: tetrahydrofuran), is preferably in the range of 10,000 to 800,000, more preferably in the range of 30,000 to 500,000, and even more preferably in the range of 50,000 to 300,000. Within the above range, an adhesive tape that has good workability in a manufacturing process because thermal flowability and compatibility with a diluent solvent can be ensured and that also has thermal durability is advantageously obtained.

The styrene resin may have a single structure such as a linear structure, a branched structure, or a multi-branched structure and may also have a combination of different structures. A styrene resin abundant in linear structures provides the adhesive tape of the present invention with a high elongation at break. In contrast, a styrene resin having a branched structure or a multi-branched structure while also having styrene blocks at its molecular ends can take a pseudo crosslinked structure and provide high cohesive strength. Thus, these are preferably used in combination according to required mechanical properties.

The styrene-isoprene-styrene copolymer can be produced by any method, and production methods known in the art can be used. Examples of the production methods include a method in which a styrene block and an isoprene block are sequentially polymerized by anionic living polymerization and a method in which a block copolymer having a living active terminal is produced and then allowed react with a coupling agent to produce a coupled block copolymer.

The styrene-isoprene copolymer can be produced by any method, and production methods known in the art can be used. Examples of the production methods include a method in which a styrene block and an isoprene block are sequentially polymerized by anionic living polymerization.

The mixture of a styrene-isoprene copolymer and a styrene-isoprene-styrene copolymer can be produced by any method, and production methods known in the art can be used. Examples of the production methods include a method in which the styrene-isoprene copolymer and the styrene-isoprene-styrene copolymer produced above are mixed together. Alternatively, the mixture can be produced at one time in one polymerization process. In a more specific aspect, firstly, a styrene monomer is polymerized using an anionic polymerization initiator in a polymerization solvent by anionic living polymerization, thereby forming a polystyrene block having a living active terminal. Secondly, isoprene is polymerized from the living active terminal of the polystyrene block to obtain a styrene-isoprene diblock copolymer having a living active terminal. Thirdly, a part of the styrene-isoprene diblock copolymer having a living active terminal are reacted with a coupling agent to form a coupled styrene-isoprene-styrene block copolymer. Fourthly, the living active terminal of the rest of the styrene-isoprene diblock copolymer having a living active terminal is deactivated with a polymerization terminator to form a styrene-isoprene diblock copolymer.

For the purpose of increasing the adhesion to the adhesive layer or increasing heat resistance, a tackifier resin can be used for the substrate. In particular, a tackifier resin having a softening point of 80° C. or higher is suitable for use, and the softening point is more preferably 90° C. or higher, still more preferably 100° C. or higher, and even more preferably 110° C. or higher. The softening point refers to a value measured by a method (dry-bulb method) prescribed in JIS K 2207.

The tackifier resin is preferably a resin that is solid, for example, at normal temperature (23° C.) and may be a petroleum resin such as a $C_5$ petroleum resin, a $C_5/C_9$ petroleum resin, or an alicyclic petroleum resin.

The petroleum resin is readily compatible with a polyisoprene structure constituting the styrene-isoprene copolymer or the styrene-isoprene-styrene copolymer, and, as a result, can further improve the initial adhesive strength and the thermal durability of the adhesive tape.

The $C_5$ petroleum resin may be an aliphatic petroleum resin, and examples include Escorez 1202, 1304, and 1401 (manufactured by Tonen Chemical Corporation), Wingtack 95 (manufactured by The Goodyear Tire & Rubber Company), Quintone K100, R100, and F100 (manufactured by Zeon Corporation), and Piccotac 95 and Piccopale 100 (manufactured by Rika Hercules Inc.).

The $C_5/C_9$ petroleum resin may be a copolymer of the $C_5$ petroleum resin and a $C_9$ petroleum resin, and examples include Escorez 2101 (manufactured by TONEX Co., Ltd.), Quintone G115 (manufactured by Zeon Corporation), and Hercotack 1149 (manufactured by Rika Hercules Inc.).

The alicyclic petroleum resin is obtained by hydrogenating the $C_9$ petroleum resin, and examples include Escorez 5300 (manufactured by TONEX Co., Ltd.), Arkon P-100 (manufactured by Arakawa Chemical Industries, Ltd.), and Rigalite R101 (manufactured by Rika Finetech Co., Ltd.).

Examples of the tackifier resin include, in addition to the $C_5$ petroleum resin, the $C_5/C_9$ petroleum resin, and the alicyclic petroleum resin, polymerized rosin resins, $C_9$ petroleum resins, terpene resins, rosin resins, terpene-phenol resins, styrene resins, coumarone-indene resins, xylene resins, and phenol resins.

In particular, the tackifier resin is preferably a combination of the $C_5$ petroleum resin and a polymerized rosin resin in order to achieve both higher initial adhesion and thermal durability.

The amount of the tackifier resin relative to the total amount of the styrene-isoprene copolymer and the styrene-isoprene-styrene copolymer is preferably in the range of 0 mass % to 100 mass %, more preferably in the range of 0 mass % to 70 mass %, still more preferably in the range of 0 mass % to 50 mass %, and even more preferably in the range of 0 mass % to 30 mass %. Within the above range, both a high elongation at break and thermal durability of the adhesive tape are readily achieved while the interfacial adhesion between the adhesive layer and the substrate layer is increased.

The substrate may optionally contain, to the extent that the properties thereof is not impaired, additives such as other polymer components, crosslinking agents, age resistors, UV absorbers, filling materials, polymerization inhibitors, surface conditioners, antistatic agents, antifoaming agents, viscosity modifiers, light stabilizers, weathering stabilizers, heat stabilizers, antioxidants, leveling agents, organic pigments, inorganic pigments, pigment dispersants, silica beads, and organic beads; and inorganic filling materials such as silicon oxide, aluminum oxide, titanium oxide, zirconia, and antimony pentoxide.

The age resistor is preferably, for example, a phenol-based age resistor because the thermal stability of the styrene-isoprene copolymer or the like can be effectively improved, and as a result, an adhesive and an adhesive tape that each maintain good initial adhesion and have higher thermal durability can be obtained.

The phenol-based age resistor is generally a phenolic compound having a sterically hindering group, typically, a monophenolic compound, a bisphenolic compound, or a polyphenolic compound. Specifically, for example, 2,6-di-t-butyl-4-methylphenol, 2,2'-methylenebis(4-methyl-6-t-butylphenol), 2,2'-methylenebis(4-ethyl-6-t-butylphenol), 4,4'-thiobis(6-t-butyl-3-methylphenol), 4,4'-butylidenebis-(3-methyl-6-t-butylphenol), tetrakis-[methylene-3-(3'5'-di-t-butyl-4-hydroxyphenyl)propionate]methane, and n-octadecyl-3-(4'-hydroxy-3'5'-di-t-butylphenyl)propionate can be used alone or in combination of two or more.

The amount of the phenol-based age resistor relative to 100 parts by mass of the styrene-isoprene block copolymer is preferably in the range of 0.1 parts by mass to 5 parts by mass. When the amount of the phenol-based age resistor is in the range of 0.5 parts by mass to 3 parts by mass, the thermal stability of the styrene-isoprene copolymer can be effectively improved, and as a result, an adhesive that maintains good initial adhesion and has higher thermal durability can be obtained.

The age resistor may be a combination of the phenol-based age resistor and another age resistor such as a phosphorus-based age resistor (also referred to as a processing stabilizer), an amine-based age resistor, or an imidazole-based age resistor. In particular, the combined use of the phenol-based age resistor and a phosphorus-based age resistor can provide an adhesive that maintains good initial adhesion and has higher thermal durability. The phosphorus-based age resistor may be slightly discolored (yellowed) over time in a high-temperature environment, and thus the amount of the phosphorus-based age resistor used is preferably set as appropriate taking into account the balance of the initial adhesion, thermal durability, and prevention of discoloration.

As a material used for the substrate of the adhesive tape of the present invention, polyurethane is also suitable for use. As the polyurethane, a reaction product of a polyol (b1-1) and a polyisocyanate (b1-2) is suitable for use.

As the polyol (b1-1), for example, polyether polyol, polyester polyol, and polycarbonate polyol can be used. In particular, as the polyol (b1-1), polyester polyol and polyether polyol can be used alone or in combination of two or more in order to obtain the mechanical properties of the substrate. When the adhesive tape is required to have heat resistance, polyester polyol is preferably used, and when the adhesive tape is required to have water resistance or biodegradation resistance, polyether polyol is preferably used.

Examples of the polyester polyol that can be used as the polyol (b1-1) include esterification reaction products of low-molecular-weight polyol and polycarboxylic acid, polyesters obtained by the ring-opening polymerization reaction of cyclic ester compounds such as ε-caprolactone, and copolyesters thereof.

Examples of the low-molecular-weight polyol include aliphatic alkylene glycols such as ethylene glycol, propylene glycol, 1,4-butanediol, 1,6-hexanediol, diethylene glycol, neopentyl glycol, and 1,3-butanediol and cyclohexanedimethanol, each having a molecular weight of about 50 to 300.

Examples of the polycarboxylic acid that can be used to produce the polyester polyol include aliphatic dicarboxylic acids such as succinic acid, adipic acid, sebacic acid, and dodecanedicarboxylic acid; aromatic dicarboxylic acids such as terephthalic acid, isophthalic acid, phthalic acid, and naphthalenedicarboxylic acid; and anhydrides and esterified products thereof.

The polyol (b1-1) may be a polyether polyol. The polyether polyol can be obtained, for example, by the addition polymerization of an alkylene oxide using, as initiators, one or more compounds having two or more active hydrogen atoms.

The polyol (b1-1) may be a polycarbonate polyol. For example, a reaction product of a carbonate and/or phosgene and a low-molecular-weight polyol described below can be used.

Examples of the carbonate include methyl carbonate, dimethyl carbonate, ethyl carbonate, diethyl carbonate, cyclo carbonate, and diphenyl carbonate.

Examples of the low-molecular-weight polyol that can react with the carbonate or phosgene include ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, 1,4-cyclohexanedimethanol, hydroquinone, resorcin, bisphenol A, bisphenol F, and 4,4'-biphenol.

As the polyol (b1-1), other polyols can be used in addition to those described above. Examples of the other polyols include acrylic polyols.

The polyisocyanate (b1-2) may be, for example, an alicyclic polyisocyanate, an aliphatic polyisocyanate, or an aromatic polyisocyanate, and is preferably an alicyclic polyisocyanate.

As the alicyclic polyisocyanate, for example, isophorone diisocyanate, 1,3-bis(isocyanatomethyl)cyclohexane, 4,4'-dicyclohexylmethane diisocyanate, 2,4- and/or 2,6-methylcyclohexane diisocyanate, cyclohexylene diisocyanate, methylcyclohexylene diisocyanate, bis(2-isocyanatoethyl)-4-cyclohexylene-1,2-dicarboxylate and 2,5- and/or 2,6-norbornane diisocyanate, dimer acid diisocyanate, and bicycloheptane triisocyanate can be used alone or in combination of two or more.

Examples of methods for producing a polyurethane (b1) by reacting the polyol (b1-1) and the polyisocyanate (b1-2) include a method in which the polyol (b1-1) placed in a reaction vessel is heated under normal-pressure or reduced-pressure conditions to remove water, and then the polyisocyanate (b1-2) is supplied batchwise or portionwise to cause a reaction.

In the reaction of the polyol (b1-1) and the polyisocyanate (b1-2), the equivalent ratio of isocyanate groups of the polyisocyanate (b1-2) to hydroxyl groups of the polyol (b1-1) (hereinafter referred to as [NCO/OH equivalent ratio]) is preferably in the range of 1.0 to 20.0, more preferably in the range of 1.1 to 13.0, still more preferably in the range of 1.2 to 5.0, and particularly preferably in the range of 1.5 to 3.0.

The conditions (e.g., temperature and time) for the reaction of the polyol (b1-1) and the polyisocyanate (b1-2) may be set as appropriate taking into account various conditions such as safety, quality, and cost and is not particularly limited. For example, the reaction temperature is preferably in the range of 70° C. to 120° C., and the reaction time is preferably in the range of 30 minutes to 5 hours.

When the polyol (b1-1) and the polyisocyanate (b1-2) are reacted together, a catalyst such as a tertiary amine catalyst or an organic metal catalyst can be used as required.

The reaction may be conducted in an environment without a solvent or in the presence an organic solvent.

Examples of the organic solvent include ester solvents such as methyl acetate, ethyl acetate, propyl acetate, and butyl acetate; ketone solvents such as acetone, methyl ethyl ketone, methyl butyl ketone, and cyclohexanone; ether ester solvents such as methyl cellosolve acetate and butyl cellosolve acetate; aromatic hydrocarbon solvents such as toluene and xylene; and amide solvents such as dimethylformamide and dimethylacetamide. These can be used alone or in combination of two or more. The organic solvent may be removed during or after the production of the polyurethane (b1) by an appropriate method such as heating under reduced pressure or drying under normal pressure.

The polyurethane (b1) obtained by the above method preferably has a softening temperature of 40° C. or higher and more preferably has a softening temperature of 50° C. or higher. The softening temperature refers to a value measured in accordance with JIS K 2207. The upper limit of the softening temperature is preferably 100° C. or lower.

For the purpose of further improving the adhesion to the adhesive layer, the substrate may be provided with a primer layer or subjected to surface treatment such as surface roughening treatment, for example, by sandblasting or solvent processing, corona discharge treatment, chromic acid treatment, flame treatment, hot air treatment, ozone treatment, UV irradiation treatment, or oxidation treatment.

Examples of methods for producing the substrate include a casting method using extrusion molding, a uniaxial stretching method, a sequential biaxial stretching method, a simultaneous biaxial stretching method, an inflation method, a tube method, a calendering method, and a solution method. In particular, a method of production by the casting method using extrusion molding, the uniaxial stretching method, the sequential secondary stretching method, the simultaneous biaxial stretching method, the inflation method, or the tube method is suitable for use, and the method may be selected according to the mechanical strength required for the adhesive tape of the present invention.

The substrate may have a single-layer structure or a multilayer structure having two layers or three or more layers. In the case of a multilayer structure, at least one layer is preferably a layer having the resin composition described above because the required mechanical properties are readily exhibited. For example, a substrate having a three-layer structure can be obtained by coextruding a thermoplastic resin such as polypropylene and the styrene-isoprene-styrene copolymer. This configuration may be suitable when it is desired to provide the adhesive tape of the present invention, for example, with moderate dimensional stability or stiffness.

EXAMPLES

The present invention will now be described in more detail with reference to examples, but the invention is not limited thereto.

[Preparation of Adhesive (1)]

In a reaction vessel equipped with a stirrer, a reflux condenser, a nitrogen inlet tube, and a thermometer, 96.4 parts by mass of 2-ethylhexyl acrylate, 2.4 parts by mass of β-carboxyethyl acrylate, 1.2 parts by mass of acrylic acid, and 98 parts by mass of ethyl acetate were placed, and under stirring, the temperature was increased to 75° C. under a stream of nitrogen. Thereafter, 2 parts by mass (solids content: 5% by mass) of a solution of azobisisobutyronitrile in ethyl acetate prepared in advance was added thereto. Thereafter, the resulting mixture was held at 75° C. for 3 hours under stirring, and then the contents were cooled and filtered through a 200-mesh metal screen. A solution of an acrylic polymer (A) having a non-volatile content of 50 mass %, a viscosity of 8,000 mPa·s, and a weight average molecular weight of 500,000 was obtained. Next, in a vessel of a planetary mixer, the solution of the acrylic polymer (A) in an amount of 100 parts by mass, aluminum hydroxide (B703 manufactured by Nippon Light Metal Co., Ltd., average particle size: 3 μm) serving as a filler in an amount of 105 parts by mass relative to 100 parts by mass of the solids content of the acrylic polymer (A), and an amine-based dispersant (BYK-112 manufactured by BYK-Chemie Japan) in an amount of 4.0 parts by mass relative to 100 parts by mass of the solids content of the acrylic polymer (A) were placed, and then stirred for 30 minutes to uniformly mix the aluminum hydroxide and the adhesive composition. Ethyl acetate was added to adjust the solids content to be 70%, thereby obtaining an adhesive composition (1). To the adhesive composition (1), a 2% ethyl acetate solution of an epoxy crosslinking agent (TETRAD C manufactured by MITSUBISHI GAS CHEMICAL COMPANY, INC.) was added in an amount of 2.1 parts relative to 100 parts of the solids content of an acrylic copolymer in the thermally conductive flame-retardant adhesive composition, and the resulting mixture was stirred with a dissolver stirrer for 30 minutes to thereby prepare an adhesive (1).

[Preparation of Adhesive (2)]

An adhesive (2) was prepared in the same manner as the adhesive (1) except that aluminum hydroxide (B103 manufactured by Nippon Light Metal Co., Ltd., average particle size: 7 μm) serving as a filler was used in an amount of 165 parts by mass relative to 100 parts by mass of the solids content of the acrylic polymer (A).

[Preparation of Adhesive (3)]

An adhesive (3) was prepared in the same manner as the adhesive (1) except that aluminum hydroxide (B153 manufactured by Nippon Light Metal Co., Ltd., average particle size: 12 μm) serving as a filler was used in an amount of 165 parts by mass relative to 100 parts by mass of the solids content of the acrylic polymer (A).

[Preparation of Adhesive (4)]

An adhesive (4) was prepared in the same manner as the adhesive (1) except that aluminum hydroxide (B103 manufactured by Nippon Light Metal Co., Ltd., average particle size: 7 μm) serving as a filler was used in an amount of 250 parts by mass relative to 100 parts by mass of the solids content of the acrylic polymer (A).

[Preparation of Adhesive (5)]

An adhesive (5) was prepared in the same manner as the adhesive (1) except that aluminum hydroxide (B103 manufactured by Nippon Light Metal Co., Ltd., average particle size: 7 μm) serving as a filler was used in an amount of 62 parts by mass relative to 100 parts by mass of the solids content of the acrylic polymer (A) and that ammonium polyphosphate (FR CROSC30 manufactured by Budenheim, average particle size: 7 μm) was used in an amount of 62 parts by mass relative to 100 parts by mass of the solids content of the acrylic polymer (A).

[Preparation of Adhesive (6)]

In a reaction vessel equipped with a stirrer, a reflux condenser, a thermometer, a dropping funnel, and a nitrogen gas inlet, 60 parts by mass of butyl acrylate, 35.95 parts by mass of 2-ethylhexyl acrylate, 4.0 parts by mass of acrylic acid, 0.05 parts by mass of 4-hydroxybutyl acrylate, and 0.2 parts by mass of 2,2'-azobisisobutylnitrile serving as a polymerization initiator were dissolved in a solvent mixture of 50 parts by mass of ethyl acetate and 20 parts by mass of n-hexane. These were polymerized at 70° C. for 8 hours to thereby obtain a solution of an acrylic copolymer (B) having a weight average molecular weight of 700,000. A filler was then added.

To 100 parts by mass of the solids content of the acrylic copolymer (B), 20 parts by mass of a polymerized rosin ester resin (D-125 manufactured by Arakawa Chemical Industries, Ltd.) and 10 parts by mass of a disproportionated rosin ester (A100 manufactured by Arakawa Chemical Industries, Ltd.) were added, and the resulting mixture was diluted with ethyl acetate to thereby obtain an adhesive solution having a solids content of 45 mass % and a 25° C. viscosity of 9,500 mPa·s.

To 100 parts by mass of the solids content of the adhesive solution, 1.7 parts by mass of an isocyanate crosslinking agent (BURNOCK NC-40 manufactured by DIC Corporation, solids content: 40 mass %, ethyl acetate solution) was added to thereby obtain an adhesive (6) in which a filler was included as shown in Table 2.

[Preparation of Adhesive (7)]

An adhesive (7) was prepared in the same manner as the adhesive (1) except that no fillers and no dispersants were used.

[Preparation of Adhesive (8)]

In a reaction vessel equipped with a stirrer, a reflux condenser, a thermometer, a dropping funnel, and a nitrogen gas inlet, 60 parts by mass of butyl acrylate, 35.95 parts by mass of 2-ethylhexyl acrylate, 4.0 parts by mass of acrylic acid, 0.05 parts by mass of 4-hydroxybutyl acrylate, and 0.2 parts by mass of 2,2'-azobisisobutylnitrile serving as a polymerization initiator were dissolved in a solvent mixture of 50 parts by mass of ethyl acetate and 20 parts by mass of n-hexane. These were polymerized at 70° C. for 8 hours to thereby obtain a solution of an acrylic copolymer (B) having a weight average molecular weight of 700,000.

To 100 parts by mass of the solids content of the acrylic copolymer (5), 20 parts by mass of a polymerized rosin ester resin (D-125 manufactured by Arakawa Chemical Industries, Ltd.) and 10 parts by mass of a disproportionated rosin ester (A100 manufactured by Arakawa Chemical Industries, Ltd.) were added, and the resulting mixture was diluted with ethyl acetate to thereby obtain an adhesive solution having a solids content of 45 mass % and a 25° C. viscosity of 9,500 mPa·s.

To 100 parts by mass of the solids content of the adhesive solution, 1.7 parts by mass of an isocyanate crosslinking agent (BURNOCK NC-40 manufactured by DIG Corporation, solids content: 40 mass %, ethyl acetate solution) was added to thereby obtain an adhesive (3).

Example 1

The adhesive (1) was applied to a release liner with an applicator such that the adhesive (1) would be 50 μm thick after being dried, and dried at 80° C. for 3 minutes to thereby produce an adhesive layer (1).

A resin composition (1) (a mixture of a styrene-isoprene copolymer and a styrene-isoprene-styrene copolymer, the styrene-derived structural unit represented by the chemical formula (1): 25 mass %, the amount of the styrene-isoprene copolymer relative to the total amount of the resin composition 1: 17 mass %) was hot-pressed (pressure: 0.5 MPa, press plate temperature: 130° C., pressing time: 2 minutes) to thereby produce a substrate having a thickness of 250 μm. The adhesive layer (1) produced above was bonded to both surfaces of the substrate and laminated with a pressure of 0.2 MPa, thereby producing an adhesive tape.

Example 2

An adhesive tape was produced in the same manner as in Example 1 except that the adhesive (1) was replaced with the adhesive (2).

Example 3

An adhesive tape was produced in the same manner as in Example 1 except that the adhesive (1) was replaced with the adhesive 3).

Example 4

An adhesive tape was produced in the same manner as in Example 1 except that the adhesive (1) was replaced with the adhesive (4).

Example 5

An adhesive tape was produced in the same manner as in Example 1 except that the adhesive (1) was replaced with the adhesive (5).

Comparative Example 1

An adhesive tape was produced in the same manner as in Example 1 except that the adhesive (1) was replaced with the adhesive (7).

Comparative Example 2

An adhesive tape was produced in the same manner as in Example 1 except that the adhesive (1) was replaced with the adhesive (8).

The adhesive tapes, substrates, and adhesive layers produced in Examples 1 to 5 and Comparative Examples 1 to 2 were tested by the methods described below. The evaluation results are shown in Tables 1 and 2.

[Tensile Strength at Break, Elongation at Break, Stress at 25% Elongation, and Stress at 50% Elongation of Adhesive Tape, Substrate, and Adhesive]

The tensile strength at break, elongation at break, stress at 25% elongation, and stress at 50% elongation of the adhesive tapes were measured in such a manner that each adhesive tape was punched into a dumbbell shape having a gauge length of 20 mm and a width of 10 mm, and using a Tensilon tensile tester, the dumbbell specimen was stretched in the longitudinal direction at a tensile speed of 300 mm/min in a measurement atmosphere at 23° C. and 50% RH.

[Storage Elastic Modulus E' of Adhesive Tape and Substrate]

Each of the adhesive tapes obtained in Examples and Comparative Examples was punched into a shape of a specimen type 5 of JIS K 7127 by using a dumbbell cutter to prepare a specimen.

The storage elastic modulus E' at 23° C. of the specimen was measured with a dynamic viscoelasticity analyzer RSA-II (frequency: 1 Hz, heating rate: 3° C./min) manufactured by Rheometrics.

[Storage Elastic Modulus G' of Adhesive Layer]

The storage elastic modulus G' in the present invention is a value measured as follows: parallel plates 7.9 mm in diameter are mounted to a viscoelasticity tester ARES 2kSTD manufactured by Rheometrics; a specimen, which is an adhesive laminated to a thickness of 2 mm, is sandwiched between the parallel plates; and the storage elastic modulus G' is measured at a frequency of 1 Hz.

[180° Peel Adhesive Strength]

An adhesive tape sample having a width of 20 mm was attached to a stainless steel plate at 23° C., and a 2 kg roller was rolled back and forth once to press the sample. The sample was allowed to stand at 23° C. for 1 hour, and then stretched in the 180° direction at a tensile speed of 300 mm/min using a Tensilon tensile tester to measure the adhesive strength.

[Method for Evaluating Shear Adhesive Strength]

Each of the adhesive tapes was cut to a size of 20 mm wide×20 mm long. In an atmosphere at 23° C. and 50% RH, the cut adhesive tape was attached to a surface of a clean and smooth-surfaced stainless steel plate 1 (hairline-polished with No. 360 waterproof abrasive paper) such that the attachment area was 20 mm×20 mm, and the opposite surface of the adhesive tape was attached to a surface of a clean and smooth-surfaced stainless steel plate 2 (hairline-polished with No. 360 waterproof abrasive paper) such that the attachment area was 20 mm×20 mm. Thereafter, they were bonded together by rolling a 5 kg roller back and forth once and left to stand in an environment at 23° C. for 24 hours to thereby prepare a specimen.

With the stainless steel plate 1 constituting the specimen being fixed, the stainless steel plate 2 was stretched in the shear direction of the adhesive tape at a rate of 300 mm/min in an atmosphere at 23° C. and 50% RH using a Tensilon tensile tester to measure the shear adhesive strength.

[Method for Evaluating Cleavage Adhesive Strength]

Each of the adhesive tapes was cut to a size of 20 mm wide×20 mm long. In an atmosphere at 23° C. and 50% RH, the cut adhesive tape was attached to a surface of a clean and smooth-surfaced aluminum plate 1 (A1050) such that the attachment area was 20 mm×20 mm, and the opposite surface of the adhesive tape was attached to a surface of a clean and smooth-surfaced aluminum plate 2 (A1050) such that the attachment area was 20 mm×20 mm. Thereafter, they were bonded together by rolling a 5 kg roller back and forth once and left to stand in an environment at 23° C. for 24 hours to thereby prepare a specimen.

With the aluminum plate 1 constituting the specimen being fixed, the aluminum plate 2 was stretched in the cleavage direction of the adhesive tape at a rate of 300 mm/min in an atmosphere at 23° C. and 50% RH using a Tensilon tensile tester to measure the cleavage adhesive strength.

[Removability]

The adhesive tape 5 mm wide×60 mm long was attached to a clean and smooth-surfaced aluminum plate such that a grip portion 5 mm wide×10 mm long was protruded, and then the opposite surface of the adhesive tape was attached to a clean and smooth-surfaced glass plate. These were pressed by rolling a roller back and forth once under a load of 2 kg to prepare a specimen. After the attachment, the specimen was left to stand in an atmosphere at 23° C. and 50% RH for 3 days, and in the atmosphere at 23° C. and 50% RH, the grip portion of the adhesive tape was stretched by hand at a rate of about 300 mm/min in a direction at 45° from the horizontal direction of the adhesive tape toward the glass.

The test was performed three times, and the breakage of the adhesive tape and the degree to which the adhesive remained on an adherend after the adhesive tape was peeled off were visually evaluated according to the following criteria.

(Evaluation Criteria)

⊚: The tape was cleanly peeled off three times.
○: The tape was cleanly peeled off twice, but broken once. The area of the adhesive tape that remained without being stretched was ⅕ or less of the initial attachment area.
Δ: The tape was cleanly peeled off twice, but broken once. The area of the adhesive tape that remained without being stretched was ⅕ or more of the initial attachment area,
x: The adhesive tape could not be peeled off, or the tape was broken twice or more.

[Method of Calculating Percentage by Volume of Filler]

The percentage by volume of the filler was calculated by ([weight of filler]/[specific gravity of filler])/([weight of resin]/[resin]+[weight of filler]/[density of filler]).

Specific gravity of resin: 0.98 g/cm2, specific gravity of aluminum hydroxide: 2.42 g/cm2, specific gravity of ammonium polyphosphate: 1.8 g/cm2.

TABLE 1

|  |  | Example 1 | Example 2 | Example 3 |
|---|---|---|---|---|
| Substrate | Type | resin composition (1) | resin composition (1) | resin composition (1) |
|  | Thickness [μm] | 250 | 250 | 250 |
|  | Storage elastic modulus E' (23° C.) [Pa] | 2.16E+06 | 2.16E+06 | 2.16E+06 |
|  | Stress at 25% elongation [MPa] | 0.95 | 0.95 | 0.95 |
|  | Tensile strength at break (MD) [MPa] | 16.62 | 16.62 | 16.62 |
|  | Elongation at break (MD) [%] | 1500 | 1500 | 1500 |
| Adhesive | Type | adhesive (1) | adhesive (2) | adhesive (3) |
|  | Thickness [μm] | 50 | 50 | 50 |
|  | Amount of acrylic resin (dry) | 100 | 100 | 100 |
|  | Filler B | AlOH3 | AlOH3 | AlOH3 |
|  | Size of filler B [μm] | 3 | 7 | 12 |
|  | Amount of filler B added | 105 | 165 | 165 |
|  | Percentage by volume of filler | 30 | 40 | 40 |
|  | Storage elastic modulus G' (23° C.) [Pa] | 9.44E+04 | 1.75E+05 | 1.65E+05 |
|  | Stress at 25% elongation [MPa] | 0.02 | 0.08 | 0.08 |
|  | Tensile strength at break (MD) [MPa] | 0.29 | 0.38 | 0.37 |
|  | Elongation at break (MD) [%] | 1130 | 830 | 830 |
| Tape | Thickness [μm] | 350 | 350 | 350 |
|  | Storage elastic modulus E' (23° C.) [Pa] | 2.10E+06 | 2.10E+06 | 2.10E+06 |
|  | Stress at 25% elongation [MPa] | 0.95 | 0.95 | 0.95 |
|  | Tensile strength at break (MD) [MPa] | 16.62 | 16.62 | 16.82 |
|  | Elongation at break (MD) [%] | 1500 | 1500 | 1500 |
| Removability |  | ○ | ○ | ○ |
| 180° peel |  | 30 | 25 | 25 |
| Shear adhesive strength |  | 220 | 240 | 220 |
| Cleavage adhesive strength |  | 260 | 250 | 250 |

TABLE 2

|  |  | Example 4 | Example 5 | Example 6 |
|---|---|---|---|---|
| Substrate | Type | resin composition (1) | resin composition (1) | resin composition (1) |
|  | Thickness [μm] | 250 | 250 | 250 |
|  | Storage elastic modulus E' (23° C.) [Pa] | 2.16E+06 | 2.16E+06 | 2.16E+06 |
|  | Stress at 25% elongation [MPa] | 0.95 | 0.95 | 0.95 |
|  | Tensile strength at break (MD) [MPa] | 16.62 | 16.62 | 16.62 |
|  | Elongation at break (MD) [%] | 1500 | 1500 | 1500 |
| Adhesive | Type | adhesive (4) | adhesive (5) | adhesive (6) |
|  | Thickness [μm] | 50 | 50 | 50 |
|  | Amount of acrylic resin (dry) | 100 | 100 | 100 |
|  | Filler B | AlOH3 | AlOH3 | AlOH3 |
|  | Size of filler B [μm] | 7 | 7 | 3 |
|  | Amount of filler B added | 250 | 62 | 105 |
|  | Filler C | — | ammonium polyphosphate | — |
|  | Size of filler C [μm] | — | 7 | — |
|  | Amount of filler C added | — | 62 | — |
|  | Percentage by volume of filler | 50 | 37 | 30 |
|  | Storage elastic modulus G' (23° C.) [Pa] | 3.44E+05 | 2.30E+05 | 9.44E+04 |
|  | Stress at 25% elongation [MPa] | 0.18 | 0.14 | 0.02 |
|  | Tensile strength at break (MD) [MPa] | 0.43 | 0.47 | 0.29 |
|  | Elongation at break (MD) [%] | 645 | 1750 | 1130 |
| Tape | Thickness [μm] | 350 | 350 | 350 |
|  | Storage elastic modulus E' (23° C.) [Pa] | 2.10E+06 | 2.10E+06 | 2.10E+06 |
|  | Stress at 25% elongation [MPa] | 0.95 | 0.95 | 0.95 |
|  | Tensile strength at break (MD) [MPa] | 16.62 | 16.62 | 16.62 |
|  | Elongation at break (MD) [%] | 1500 | 1500 | 1500 |
| Removability |  | ○ | Δ | ○ |
| 180° peel |  | 15 | 18 | 28 |
| Shear adhesive strength |  | 310 | 350 | 390 |
| Cleavage adhesive strength |  | 300 | 320 | 450 |

TABLE 3

|  |  | Comparative Example 1 | Comparative Example 2 |
|---|---|---|---|
| Substrate | Type | resin composition (1) | resin composition (1) |
|  | Thickness [μm] | 250 | 250 |
|  | Storage elastic modulus E' (23° C.) [Pa] | 2.16E+06 | 2.16E+06 |
|  | Stress at 25% elongation [MPa] | 0.95 | 0.95 |
|  | Tensile strength at break (MD) [MPa] | 16.62 | 16.62 |
|  | Elongation at break (MD) [%] | 1500 | 1500 |
| Adhesive | Type | adhesive (7) | adhesive (8) |
|  | Thickness [μm] | 50 | 50 |
|  | Amount of acrylic resin (dry) | 100 | 100 |
|  | Filler B | none | none |
|  | Size of filler B [μm] | — | — |
|  | Amount of filler B added | — | — |
|  | Percentage by volume of filler | 0 | 0 |
|  | Storage elastic modulus G' (23° C.) [Pa] | 2.75E+05 | 2.75E+05 |
|  | Stress at 25% elongation [MPa] | 0.13 | 0.13 |
|  | Tensile strength at break (MD) [MPa] | 3.08 | 3.08 |
|  | Elongation at break (MD) [%] | 1350 | 1350 |
| Tape | Thickness [μm] | 350 | 350 |
|  | Storage elastic modulus E' (23° C.) [Pa] | 2.10E+06 | 2.10E+06 |
|  | Stress at 25% elongation [MPa] | 0.95 | 0.95 |
|  | Tensile strength at break (MD) [MPa] | 16.62 | 16.62 |
|  | Elongation at break (MD) [%] | 1500 | 1500 |

TABLE 3-continued

|  | Comparative Example 1 | Comparative Example 2 |
|---|---|---|
| Removability | X | X |
| 180° peel | 30 | 22 |
| Shear adhesive strength | 480 | 440 |
| Cleavage adhesive strength | 370 | 560 |

The above results show that in Examples 1 to 6 of the present invention, the adhesion to a hard adherend is high, and the adhesive tape can be easily peeled off without leaving the adhesive even if the adhesive tape is stretched at an angle of 45° from the horizontal direction, and the removability is high. In contrast, in Comparative Examples 1 to 2, the adhesion, the conformability, and the removability could not be simultaneously satisfied.

The invention claimed is:

1. An article comprising:
   a first adherend,
   a second adhered, and
   an adhesive tape, the first adherend adhered with the second adherend by means of the adhesive tape such that a part of the adhesive tape as a grip portion is extended outside the first adherend and the second adherend, the adhesive tape comprising:
   a substrate comprising a block copolymer of an aromatic polyvinyl compound and a conjugated diene compound; and
   an acrylic adhesive layer containing an acrylic polymer, and an inorganic filler, the acrylic adhesive layer formed on one surface or both surfaces of the substrate, wherein the inorganic filler is contained in the acrylic adhesive layer at an amount of 15 to 80 vol %, wherein the adhesive tape has a thickness of more than 150 μm and less than 1,500 μm, an elongation at break of 600% to 3,000%, and a tensile strength at break of 2.5 to 80.0 MPa,
   wherein the grip portion is pulled away from the first adherend and the second adherend when the adhesive tape is peeled off from the first adherend and the second.

2. The article according to claim 1, wherein the adhesive tape has a stress at 25% elongation of 0.05 to 10 MPa.

3. The article according to claim 1, wherein the adhesive tape has a storage elastic modulus E' (23° C.) of $1.0 \times 10^4$ to $1.0 \times 10^8$ Pa.

4. The article according to claim 1, wherein the adhesive tape has a 180° peel adhesive strength of not less than 5 N/20 mm.

5. The article according to claim 1, wherein the inorganic filler is contained in the acrylic adhesive layer at an amount of 20 to 70 vol %.

6. The article according to claim 5, wherein the inorganic filler is contained in the acrylic adhesive layer at an amount of 30 to 50 vol %.

7. The article according to claim 6, wherein the inorganic filler is selected from the group consisting of metal, metal hydroxide, metal oxide, silicate, carbon, and silica.

8. The article according to claim 6, wherein the inorganic filler is selected from the group consisting of metal and metal hydroxide.

9. The article according to claim 8, wherein the metal is selected from the group consisting of aluminum, magnesium, zirconium, calcium, barium, tin, nickel, titanium, copper, silver, and gold, and the hydroxide is selected from the group consisting of aluminum hydroxide, magnesium hydroxide, zirconium hydroxide, calcium hydroxide, and barium hydroxide.

10. The article according to claim 6, wherein the inorganic filler has a shape of non-platy or non-scaly shape and has an aspect ratio of 1 to 10.

11. The article according to claim 6, wherein the inorganic filler has an average particle size of 0.01 μm to 70 μm.

12. The article according to claim 6, wherein the inorganic filler has an average particle size of 0.5 μm to 15 μm.

13. The article according to claim 6, wherein the block copolymer is selected from the group consisting of a styrene-isoprene-styrene copolymer, a styrene-butadiene-styrene copolymer, a styrene-ethylene-butylene copolymer, or a styrene-ethylene-propylene copolymer.

14. The article according to claim 6, wherein the block copolymer comprising a mixture of a styrene-isoprene copolymer and a styrene-isoprene-styrene copolymer.

15. The article according to claim 13, wherein the adhesive tape has a storage elastic modulus E' at 23° C. of $1.0 \times 10^4$ to $8.0 \times 10^6$ Pa.

16. The article according to claim 1, wherein the acrylic adhesive layer further contains a pigment dispersant.

* * * * *